United States Patent
Shen

(10) Patent No.: US 6,573,664 B2
(45) Date of Patent: Jun. 3, 2003

(54) HIGH EFFICIENCY HIGH POWER FACTOR ELECTRONIC BALLAST

(75) Inventor: Eric Shen, Scarborough, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/872,422

(22) Filed: May 31, 2001

(65) Prior Publication Data

US 2002/0180379 A1 Dec. 5, 2002

(51) Int. Cl.[7] .............................................. H05B 41/24
(52) U.S. Cl. ....................... 315/247; 315/224; 315/225; 315/226; 315/291
(58) Field of Search ................................ 315/247, 224, 315/225, 226, 246, 276, 283, 291, 307, 360

(56) References Cited

U.S. PATENT DOCUMENTS

| | | | | |
|---|---|---|---|---|
| 4,745,341 A | * | 5/1988 | Herres | 315/246 |
| 5,059,869 A | | 10/1991 | Albach et al. | 315/289 |
| 5,177,408 A | * | 1/1993 | Marques | 315/291 |
| 5,408,403 A | * | 4/1995 | Nerone et al. | 315/247 |
| 5,481,162 A | | 1/1996 | Boenigk et al. | 315/307 |
| 5,917,289 A | * | 6/1999 | Nerone et al. | 315/209 R |
| 6,020,691 A | | 2/2000 | Sun et al. | 315/307 |
| 6,366,029 B1 | * | 4/2002 | Billings | 315/244 |

* cited by examiner

*Primary Examiner*—Don Wong
*Assistant Examiner*—Thuy Vinh Tran

(57) ABSTRACT

A method and apparatus for driving a ballast in critical discontinuous mode (CDCM). The method provides for zero loss switching in order to maximize efficiency, and also provides controllable input and output power without the use of complex and costly feedback loops.

32 Claims, 6 Drawing Sheets

HIGH EFFICIENCY HIGH POWER FACTOR ELECTRONIC BALLAST

TECHNICAL FIELD

This invention relates to a ballast for lighting devices, and in particular, to an electronic ballast for discharge lamps.

DESCRIPTION OF THE PRIOR ART

The most efficient electrical lighting sources that are commonly available are gaseous, low pressure and high-pressure discharge lamps. Examples of these include high intensity discharge (HID) lamps. These types of lamps typically utilize a gas sealed within a tube, which gives off light when excited with an electrical signal.

Electronic ballasts typically include switching transistors and utilize high switching frequencies to convert energy into an appropriate form to drive the lamps. For HID lamps, it is common to drive the lamps with a low frequency (for example 100 Hz) square wave of current. Electronic ballasts of this type typically switch transistors off and on utilizing a duty cycle selected to adjust the power delivered to the lamp. More specifically, the power that the ballast delivers is typically determined from the duty cycle of switching transistors, wherein a greater duty cycle implies a higher amplitude driving current, which results in more power and thus a brighter light output.

FIG. 1 shows a prior art technology described U.S. Pat. No. 5,917,290, issued to Shen, the applicant herein. In accordance with FIG. 1, an output light source $V_{out}$ is driven by an input voltage $V_{in}$ through a ballast control circuit as shown. In such systems, the switching cycle of the bridge transistors M3 and M4 is synchronized with the input mains voltage. Switches M1, M2, M5 and M6 are operated at high frequency in order to shape the current drawn from the mains and to deliver a square wave of current to the lamp that is synchronized to the mains.

In operation, the switches M1 through M6 operate in conjunction with each other, with M1, M2, M5 and M6 operated in a high frequency pulse width modulation mode (PWM) to drive the output light source $V_{out}$. In such an arrangement, the current through L1 is regulated by the switching of transistors M1 and M2 in a manner such that a sinusoidal wave current is present in L1. The sinusoidal wave effectively follows the input voltage $V_{in}$, scaled by a prescribed factor. Similarly, the current through L2 is regulated by the switching of transistors M5 and M6 in a manner such that a square wave of current is present in L2.

In order to control the power drawn from the input, the current through inductor L1 must be monitored, and the duty cycle utilized to switch transistors M1 and M2 appropriately adjusted through a feed-back loop in order to provide the proper amplitude.

FIG. 1A shows the representation of the current flowing through inductor L1 of FIG. 1, superimposed upon the switching state of the transistor M2. As FIG. 1A shows, the current within inductor L1 is substantially constant for any switching cycle, a switching cycle referring to the high frequency switching cycles of M1 and M2.

Similarly, in order to control the power delivered to the output, the current through inductor L2 must be monitored, and the duty cycle utilized to switch transistors M5 and M6 appropriately adjusted through a feedback loop in order to provide the proper amplitude.

Although the arrangement of the '290 patent solves many of the prior art problems, there are still two problems that the '290 arrangement does not solve. First, as previously indicated, the amplitude of the current flowing through L1, and thus of the power drawn from the input, is controlled by rapidly switching the transistors off and on. The particular sequence of switching these transistors off and on as described in the '290 patent and other prior art systems results in significant power loss through the ballast. A similar situation exists with inductor L2 and switches M5 and M6. Accordingly, the arrangement is less efficient than desired.

Second, the technique utilized for matching the current through inductor L1 to a specified AC voltage is a feedback loop. More specifically, the current through L1 is monitored, fed back to an error amplifier, and the output of such error amplifier is utilized to adjust the duty cycle of the transistors in order to increase or decrease the current through L1 to the desired value. A similar feedback loop arrangement must be utilized for the current in L2. The constant monitoring of the currents through L1 and L2 and the use of the feedback loops requires additional components (not shown in FIG. 1) which add to the cost and complexity of the ballast circuit.

In view of the above, there exists a need in the art for a more cost effective manner of controlling a ballast to drive a lighting device.

SUMMARY OF THE INVENTION

The above and other problems of the prior art are overcome and a technical advance achieved in accordance with the present invention. An electronic ballast is driven using critical discontinuous mode (CDCM) operation of both the input and output stages. In CDCM, the current through the input inductor L1 is switched on and off so that it ramps up and down creating a triangular type wave form during each high frequency switching cycle. The envelope of the triangle peaks outlines the desired waveform, and the actual waveform produced, after filtering, is the desired sinusoidal waveform. The output stage is also operated in CDCM such that the resulting current through inductor L2 also has a high frequency triangular waveform. The envelope of the triangle peaks outlines the desired waveform, and the actual waveform produced after filtering is the desired square waveform.

By utilizing CDCM and a constant charging time, the amplitude of the input current directly follows a prescribed portion of the supply voltage. It is only necessary to measure the zero crossing of the input inductor current so that the system can maintain the triangular waveform. The prior art feedback loop which continuously monitors the input current is eliminated and a simple zero crossing sensor is utilized instead. In an enhanced embodiment, the PWM switches are switched on and off in a manner such that lossless switching occurs by timing the switching correctly.

In a further enhanced embodiment, a saturable transformer is added in order to monitor when the inductor current reaches zero and properly time the switching. The complexity required to monitor zero crossings in an inductor current is significantly less than that of continuously monitoring the value of an inductor current and feeding it back for an adjustment, therefore simplifying the complexity, and reducing the cost, of the circuitry.

Similarly, by utilizing CDCM, the amplitude of the output current directly follows the DC bus voltage with polarity alternating with the mains voltage as controlled by the switching of switches M3 and M4. Again, it is only necessary to measure the zero crossings of the inductor current, thus eliminating the feedback loop. With proper switch timing, lossless switching can be achieved.

Further advantage and functionalities of the present invention will become apparent from review of the following detailed description and drawings of an exemplary embodiment of the present invention.

DETAILED DESCRIPTION OF THE PREFERRED EMBODIMENT

Figure 2:
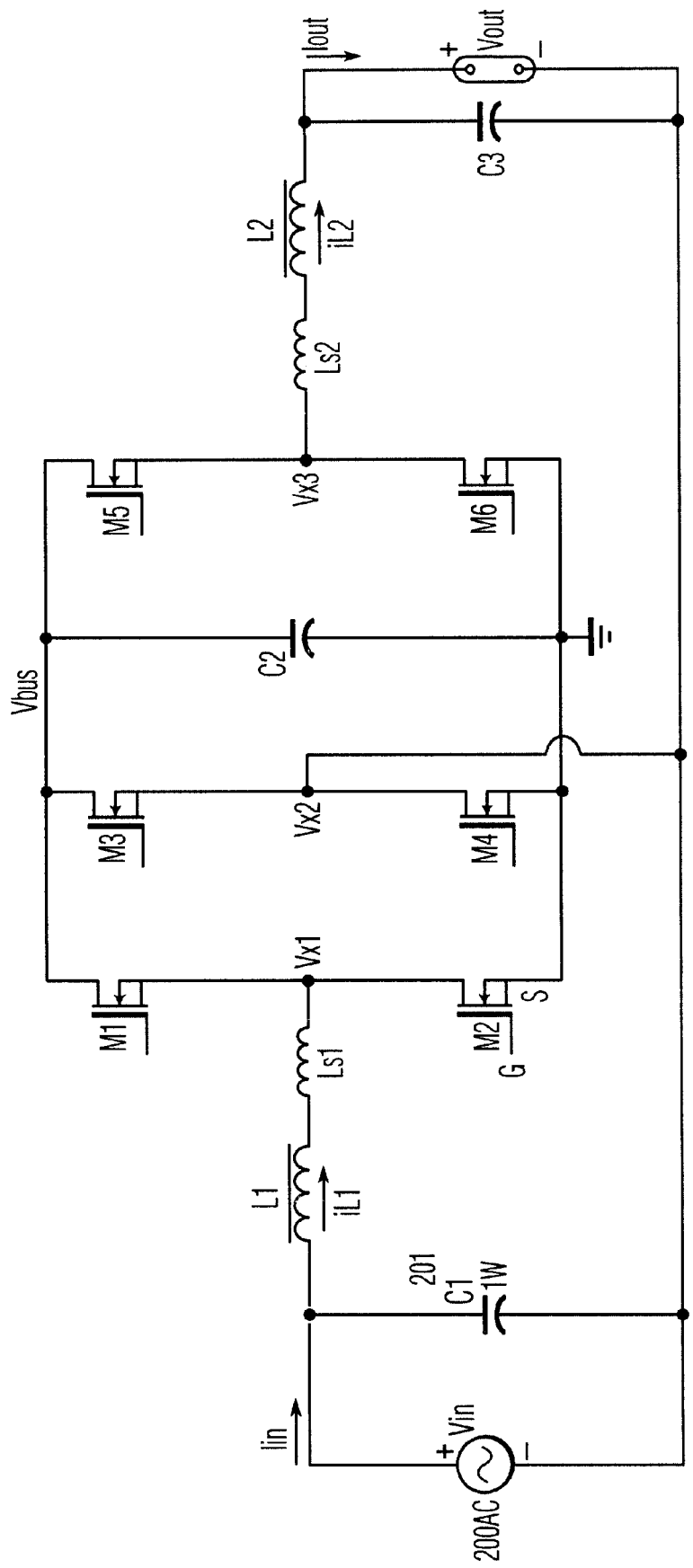
FIG. 2 depicts the circuitry of an exemplary embodiment of the present invention.

FIG. 2 depicts an exemplary embodiment of a circuit implementing the present invention. The arrangement of FIG. 2 includes an input voltage source 200 connected in parallel with a capacitor 201, and an inductor L1 coupled to a saturable transformer Ls1. Two switching transistors M1 and M2 control the delivery of current from the input stage to the ballast. The saturable transformer Ls1 serves to measure the zero crossing of the inductor current in L1 to control the timing of the system, as described below.

Figure 3A:
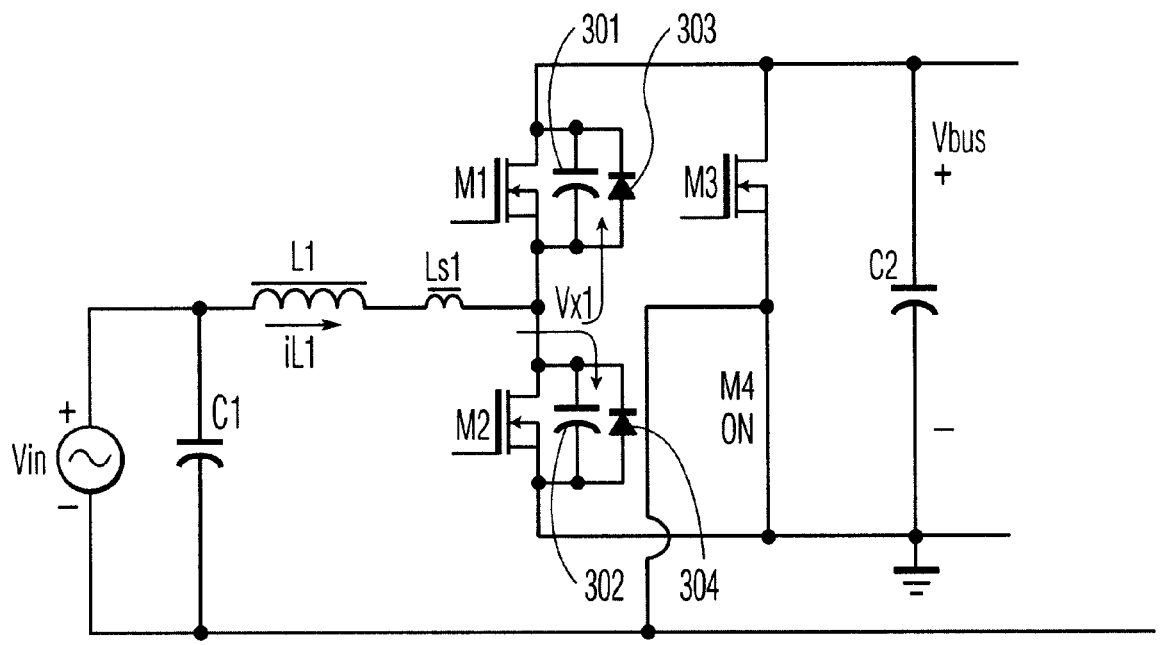
FIG. 3 depicts the state of circuitry for an exemplary embodiment of the present invention during a prescribed state.
Figure 3B:
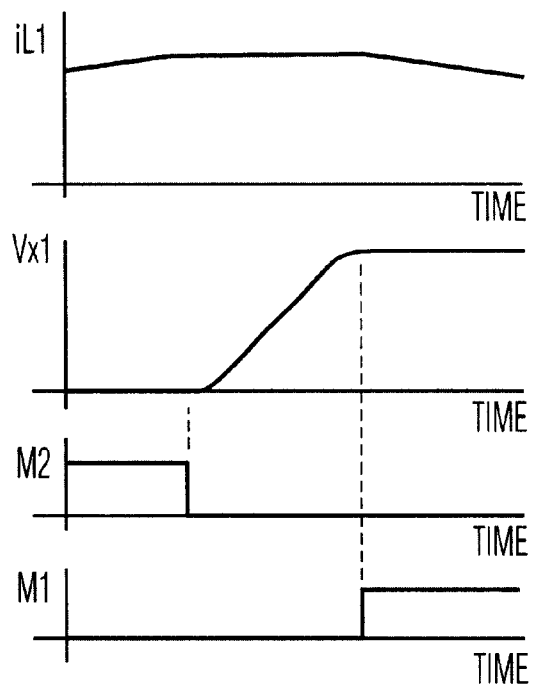

FIG. 3 shows a slightly more detailed view of the input stage wherein each switching transistor is shown with its associated parasitic capacitances, being 301 and 302, respectively, as indicated, and its body diodes 303 and 304, respectively.

In accordance with the present invention, the capacitance and diode inherent in switching transistors M1 and M2 are utilized in an advantageous manner for the purpose of creating the resonant network that may be switched in a lossless manner.

Figure 4A:
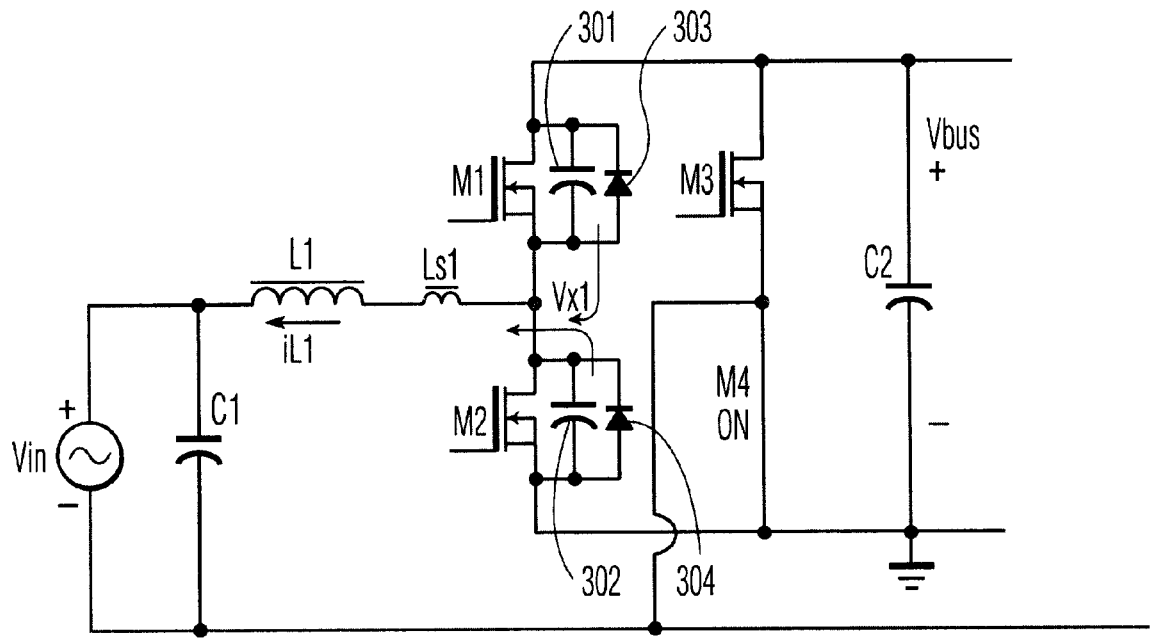
FIG. 4 depicts the state of the circuitry and current flow through an exemplary embodiment of the invention for a different prescribed state.
Figure 4B:
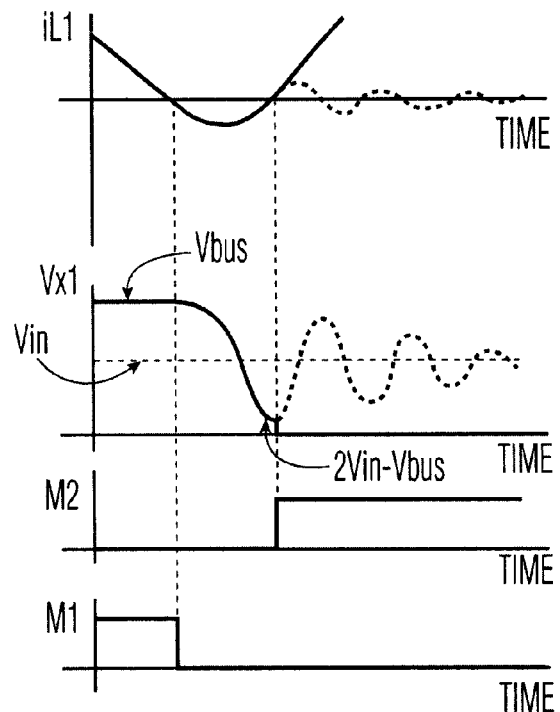

The timing and operation of the ballast will now be described with respect to FIGS. 3 through 8. We note that only one switching cycle of the PWM signaling is shown. Additionally, note that while FIGS. 3 and 4 show only the input stage of the ballast, the output stage shown in FIG. 2 (right half of drawing) is operated in a substantially identical manner.

Figure 1:
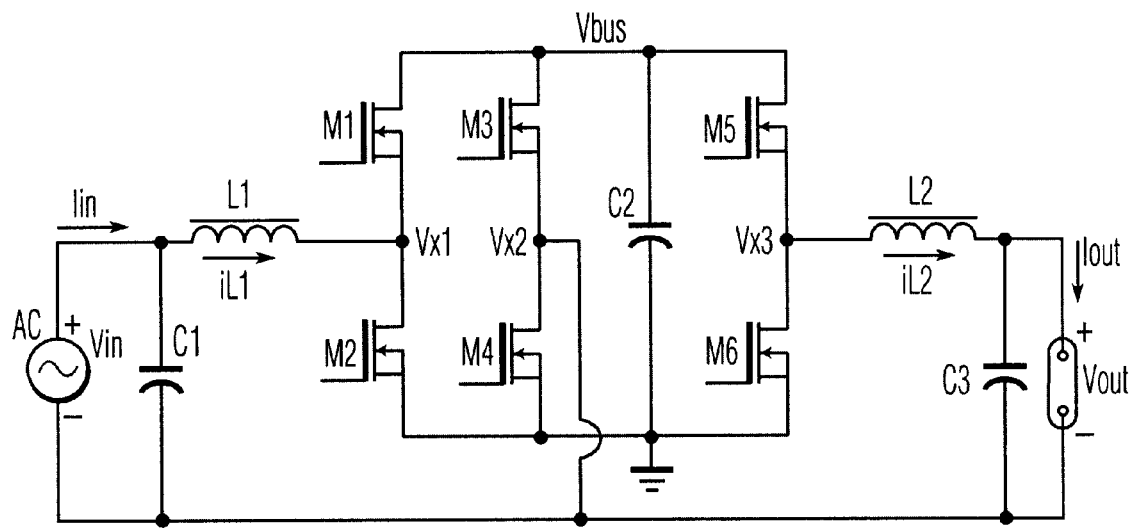
FIG. 1 depicts a prior art ballast circuit for driving a lighting device.
Figure 1A:
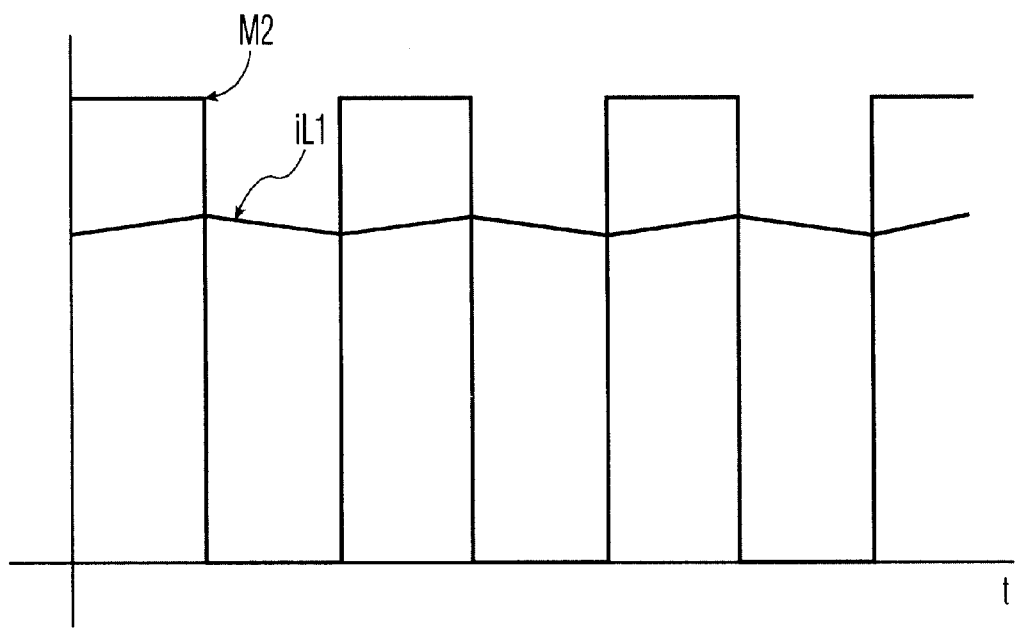
FIG. 1A depicts a switching waveform and an inductive current waveform superimposed, the waveforms being taken from a typical prior art ballast arrangement.
Figure 5:
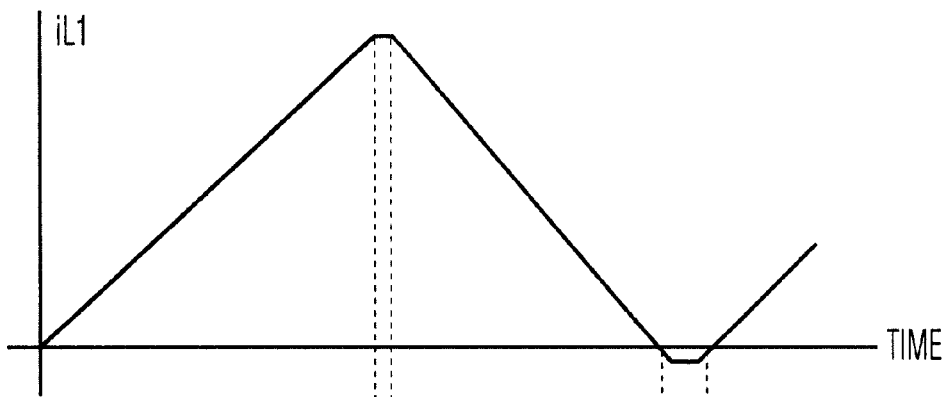
FIG. 5 depicts the waveform of current through the input inductor utilizing the present invention.
Figure 6:
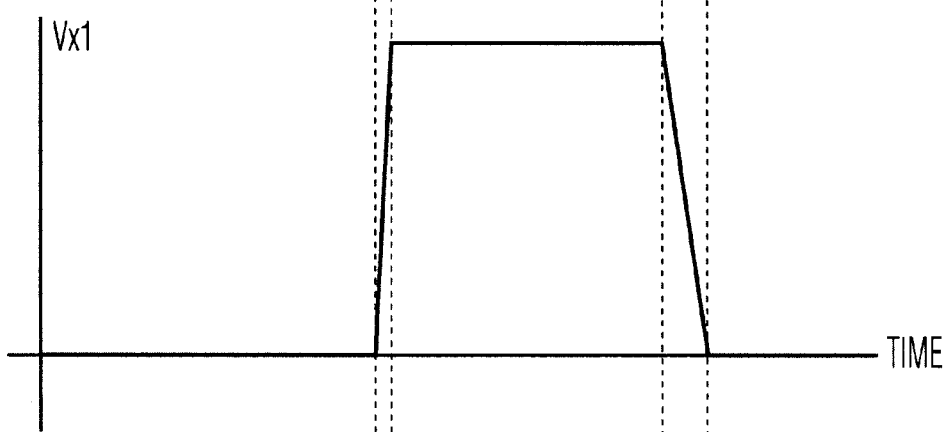
FIG. 6 depicts the voltage at a prescribed point in the circuitry as a function of time as the invention operates.

Referring to FIG. 2, when Vin is positive switch M4 is closed. During the initial operation of a high frequency switching cycle, switch M2 is closed. The closed switch M2 provides a short circuit from ground to inductor L1. As a result, the entire voltage $V_{in}$ is present across L1. The current through L1 is increasing linearly during this stage. This stage is indicated graphically in the timing diagrams of FIGS. 5 through 8, where stage 1 shows the current in L1 ramping up linearly during this time. As shown in FIG. 6, since M2 acts effectively as a short circuit to ground, the voltage at point $V_{x1}$ of FIG. 1 is zero during stage 1.

Figure 7:
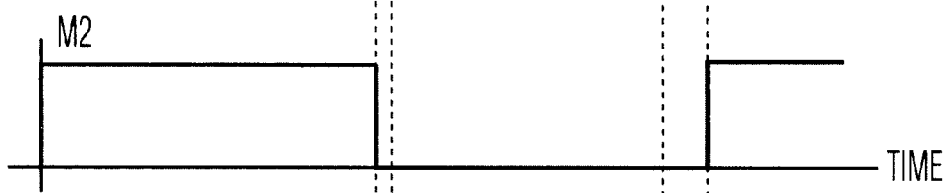
FIG. 7 depicts an exemplary timing diagram of a switching transistor that is part of the present invention.
Figure 8:
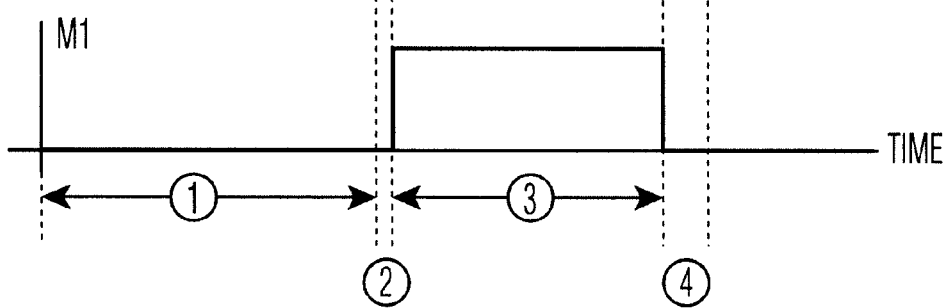
FIG. 8 depicts an exemplary timing diagram of the operation of a second switching transistor.
Figure 9A:
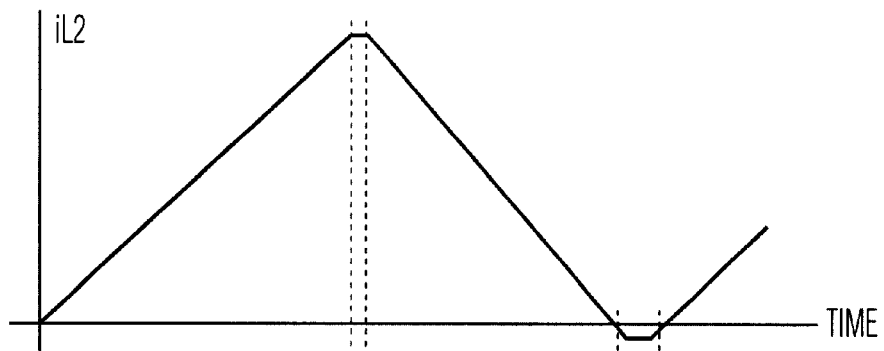
FIGS. 9(a)–(d) depict a similar series of exemplary timing diagrams related to the output stage switches M5 and M6 of FIG. 2.
Figure 9B:
Figure 9C:
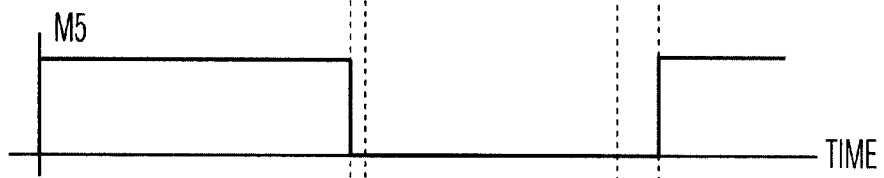
Figure 9D:
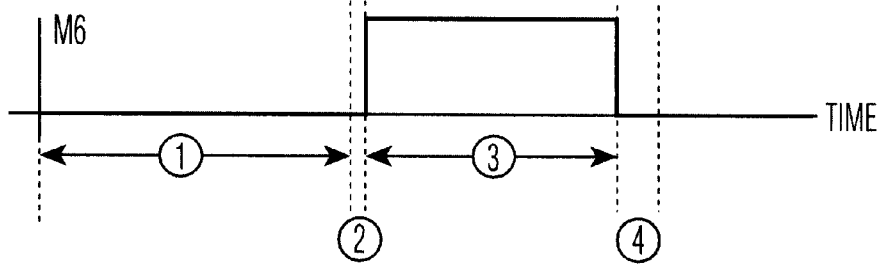

During stage 2, M2 is opened, cutting off the path of current between $V_{x1}$ and ground. Since the current iL1 in inductor L1 tends to keep flowing, it is split between the parasitic capacitors 301 and 302 of switches M1 and M2 respectively, as shown more clearly in FIG. 3. During this stage 2, capacitor 301 begins discharging and capacitor 302 begins charging, thereby bringing the voltage at point $V_{x1}$ up to $V_{bus}$ The timing of stage 2 is shown in FIGS. 5 through 8. Note that the time axis is divided into numbered states at the bottom of FIG. 8. More specifically, the current iL1 tends to remain flowing as it was prior to switch M2 being opened. FIG. 6 shows that during stage 2, as capacitor 301 tends to discharge and capacitor 302 tends to charge, the voltage at point $V_{x1}$ ramps up from ground to $V_{bus}$, substantially linearly as shown in FIG. 6. FIG. 7 and 8 show the states of switches M2 and M1, respectively, during this stage 2.

At substantially the time that the voltage $V_{x1}$ reaches $V_{bus}$, stage 3 is entered. Stage 3 is initiated by closing M1, which makes the voltage across L1 equal to $V_{in}-V_{bus}$. Since $V_{bus}$ must be greater than $V_{in}$ (for example, $V_{bus}$ =200V for $V_{in}$=120Vrms) the voltage across L1 is now negative during stage 3. As a result, the current iL1 begins to decrease linearly as shown in FIG. 5. Additionally, $V_{x1}$ remains substantially constant during this decrease in current as shown in FIG. 6. Eventually, at the end of stage 3, the current iL1 will reach substantially zero. The current reaching zero may be detected by a simple detector, such as Ls1 shown in FIG. 3. When the current iL1 reaches zero, or even slightly negative, stage 4 is entered.

Stage 4 is initiated by opening the switch M1. This causes $V_{x1}$ to decrease while the current iL1 goes negative. When $V_{x1}$ reaches its minimum value near ground, M2 can be closed once again starting the cycle over. This timing is also illustrated in FIGS. 5–8.

In essence, in stage 4, a resonant network is formed by L1, and capacitors 301 and 302. The resonant network oscillates, and as the current in L1 becomes negative, capacitor 301 is charged and capacitor 302 discharged. This causes the known $V_{x1}$ to decrease from the voltage $V_{bus}$ to ground.

In order to ensure that the switching is lossless, it is desirable that the turning on or off of either of transistors M1 or M2 is accomplished when there are zero volts across each switch. In the case of M1, this means that it should switch on when $V_{x1}$ is at $V_{bus}$, so that there is no voltage drop across M1. In the case of M2, this means that it should switch on when $V_{x1}$ is at ground, so there is no voltage drop across M2.

We note however, that $V_{x1}$ can actually reach a value of slightly different from ground, as an analysis of the circuit of FIG. 4 reveals. More specifically, as capacitors 301 and 302 charge and discharge the value reached by $V_{x1}$ is actually $2V_{in}-V_{bus}$, which could be slightly more or less than ground. However, if $V_{x1}$ tends below ground, it will be clamped at ground by diode 304. Alternatively, if $V_{x1}$ only goes down near ground, but does not reach ground, then the switching should be done at the minimum value of $V_{x1}$ to minimize losses. While switching at a value slightly greater than zero is not lossless, in nonetheless will minimize loss.

A still further enhancement will ensure that the voltage $V_{x1}$ always returns to zero at the time of switching. In this regard, it is possible to remain in stage 3, shown in FIGS. 5–8, until the current iL1 goes slightly negative before switching to stage 4, thus ensuring that there is always a time when $V_{x1}$ goes to zero, and thus effectuating lossless switching.

The output stage of the ballast, which is comprised largely of switches M5 and M6, operates in a similar manner to that described for the input stage above. FIG. 9, plots (a)–(d), show the timing diagrams related to the operation of switches M5 and M6, as well as the related voltages $V_{X3}$ and current iL2 depicted in FIG. 2. As will be appreciated from the foregoing, the operation and timing of the output stage of the ballast is similar to that of the input stage. FIGS. 9(a)-(d) correspond to FIGS. 5–8, respectively.

In operation, during the state indicated as (1) in FIG. 9, M5 is closed and M6 is open. The voltage across L2 is $V_{bus} - V_{out}$. As a result, the current iL2 increases linearly. After a prescribed time (1), M5 is turned off (i.e. opened), which results in the output stage entering state (2) of FIG. 9. In state 2, since M5 is opened, the current iL2 splits between the parasitic capacitors present within M5 and M6. As was described with respect to the input portion of the ballast, the M6 parasitic capacitance discharges while the M5 parasitic capacitance charges. This causes $V_{X3}$ to drop, as shown in FIG. 9(b), towards ground. When $V_{X3}$ reaches at or near ground, the body diode within M6 will clamp $V_{X3}$ to ground and switch M6 may be turned on. The turning on of switch M6 at this stage is substantially lossless, since the dropping of $V_{X3}$ to ground means there is no voltage drop across M6 at the end of state (2). Switching M6 closed at that point results in substantially lossless switching. It is noted that even if the switching takes place at a point when $V_{X3}$ is not exactly at ground, this simply means that the switching will involve some minor loss, rather than be totally lossless. However, even so, most of the advantage of the present invention will still be achieved.

Continuing with the timing diagram of FIG. 9, when state (3) is entered, M6 is closed in a substantially lossless manner. The current iL2 begins decreasing linearly as shown in FIG. 9(a). When iL2 reaches zero (or very slightly negative), M6 is opened and the circuit enters state (4).

In state (4), M6 is opened. During state (4), the current iL2 is slightly negative, causing the parasitic capacitance in M6 to charge while the parasitic capacitance in M5 discharges. As a result, the voltage $V_{X3}$ climbs to $V_{bus}$ as shown. In actuality, $V_{X3}$ will reach a peak value of twice $V_{out}$, which may be greater or less than $V_{bus}$. If twice $V_{out}$ is greater than $V_{bus}$, the body diode of M5 will clamp $V_{X3}$ to $V_{bus}$. If $V_{X3}$ does not reach $V_{bus}$, then M5 can be switched on at the peak value of $V_{X3}$, thus minimizing losses.

It is also noted, that in a manner similar to that described with respect to the input portion of the ballast, it is possible to allow iL2 to go negative before entering state (4). If the switching occurs after iL2 becomes negative, then additional energy will be stored in L2, which will ensure that Vx2 always reaches Vbus, and that M5 can always be switched in a substantially lossless manner.

It can be appreciated that this is a symmetrical circuit in the sense that the output stage switches M5 and M6 operate substantially identically to the input stage switches M1 and M2. Furthermore, when $V_{in}$ is negative, switch M3 is on and M4 is off, and the circuit operates similarly as described. In that case, the roles of M1 and M2 are reversed as well, and the polarity of iL1 is thus reversed. Similarly, the roles of M5 and M6 are reversed and the polarity of iL2 is reversed. Given these polarity differences, the circuit operates substantially identically as it does for the case $V_{in}>0$, as described above.

While the above describes the preferred embodiment of the invention various other modifications and additions will be apparent to those of skill in the art. Such modifications are intended to be covered by the following claims.

What is claimed is:

1. A ballast for driving a discharge device, the ballast comprising:
   an input voltage source connected to at least one other circuit element to produce a series of signals, the series of signals having an envelope; and
   an inductor connected between the input voltage source and said at least one other circuit element, said at least one other circuit element including means for determining zero crossings of a current signal in said inductor.

2. The ballast of claim 1 wherein the at least one other circuit element comprises at least two active switches, and means for controlling the switches such that they switch on and off at different times.

3. The ballast of claim 2 wherein the switching off and on of the at least two switches is such that the series of signals is a series of substantially triangular shaped waveforms.

4. The ballast as claimed in claim 3 wherein said zero crossings determining means further comprises a winding of a transformer coupled to the inductor so as to determine the zero-crossings of the current in the inductor.

5. The ballast as claimed in claim 4 wherein the transformer is a saturable transformer and said winding is coupled in series with the inductor.

6. The ballast as claimed in claim 3 wherein the series of signals of triangular shaped waveforms have different amplitudes such that the envelope thereof is approximately sinusoidal.

7. The ballast as claimed in claim 3 wherein the controlling means and the zero-crossings determining means cooperate to operate the two active switches in the critical discontinuous mode (CDCM).

8. The ballast as claimed in claim 3 further comprising two further active switches that switch on and off out of phase with each other, and
   a second inductor supplied with current in response to said switching, wherein the current in the second inductor is in the form of a series of substantially triangular waveforms of constant amplitude.

9. A ballast comprising an input power source and capacitor directly connected in parallel to form a combination, and means connecting the combination in series with a first inductor and with a winding of a transformer configured to determine the zero-crossing of the current in the first inductor.

10. The ballast of claim 9 wherein the transformer is a saturable transformer configured to indicate the zero-crossing of the current in the first inductor.

11. A method of controlling a lighting ballast comprising the steps of connecting two switches at a first point, connecting a first side of an inductor to said first point and a second side of the inductor to a power supply, and turning the switches on and off (1) at different times from one another, and (2) at times when there is substantially zero voltage across the switch being turned on or off.

12. The method of claim 11 further comprising the step of leaving a first of the switches open and a second of the switches closed while current in the inductor increases to a maximum.

13. The method of claim 12 further comprising, after said current reaches said maximum, opening said second of said switches.

14. The method of claim 13 wherein, after said second of said switches is opened, said first of said switches is closed.

15. The method of claim 14 which further comprises; after said second of said switches is opened and said first of said switches is closed, opening the first of said switches while the second of said switches remains open.

16. The method of claim 15 which further comprises; after said first of said switches is opened while the second of said switches remains open, closing the second of said switches.

17. A ballast apparatus for driving a lamp comprising two switching transistors that switch on and off out of phase with each other, and an inductor coupled between an AC source of input voltage and the two switching transistors and supplied with current in response to said switching, wherein the inductor current is in the form of a series of substantially triangular waveforms of varying amplitudes, and means for utilizing said inductor current to drive a discharge lamp.

18. The ballast apparatus of claim 17 further comprising a filter coupled to the inductor via a bi-directional current path exclusive of the discharge lamp so that said triangular waveforms are first filtered prior to being utilized to drive said discharge lamp.

19. The ballast apparatus of claim 18 wherein said inductor is connected to a transformer.

20. The ballast apparatus as claimed in claim 17 further comprising two further switching transistors that switch on and off out of phase with each other, and a second inductor supplied with current in response to said switching, wherein the current in the second inductor is in the form of a series of substantially triangular waveforms of constant amplitude, wherein
    said two switching transistors and said two further switching transistors are operated in the critical discontinuous mode (CDCM) to derive the triangular current waveforms in the first and second inductors.

21. An electronic ballast for a discharge lamp comprising;
    first and second input terminals for connection to a source of AC supply voltage,
    a pair of output terminals for connection to a discharge lamp,
    a storage capacitor,
    first and second switching transistors serially connected in parallel with the storage capacitor,
    a first inductor coupled between the first input terminal and a circuit point between the first and second switching transistors,
    first means coupling the storage capacitor to at least a first one of the output terminals,
    means for switching the first and second switching transistors on and off in mutually exclusive time intervals and at a high frequency such that in one-half cycle of the AC supply voltage, when the first switching transistor is on a linear charge current flows through the inductor, and when the second switching transistor is on a linear discharge current flows through the inductor, the envelope of said linear charge and discharge currents approximating a sine wave,
    means for detecting when the linear discharge current in the inductor reaches zero, whereat the cycle is repeated, and
    second means coupling the second output terminal to the second input terminal.

22. The electronic ballast as claimed in claim 21 wherein said detecting means comprises a saturable transformer connected in series circuit with the first inductor.

23. The electronic ballast as claimed in claim 21 wherein the switching means switches the first switching transistor on for a fixed on-time during said one-half cycle of the AC supply voltage and the detecting means causes the second switching transistor to turn off when it detects the zero value of the linear discharge current in the first inductor.

24. The electronic ballast as claimed in claim 21 wherein the itching means and the detecting means cooperate to drive the first and second switching transistors to operate in the critical discontinuous mode (CDCM) in which a short delay is present at switching of the first and second switching transistors such that both of said switching transistors are turned off.

25. The electronic ballast as claimed in claim 21 wherein said first coupling means comprises;
    third and fourth switching transistors serially connected in parallel with the storage capacitor,
    a second inductor coupled between the first output terminal and a circuit point between the third and fourth switching transistors, and
    said switching means switches the third and fourth switching transistors on and off in mutually exclusive time intervals and at a high frequency such that a square wave current is supplied to the pair of output terminals.

26. The electronic ballast as claimed in claim 25 further comprising;
    second means for detecting when a current flowing in the second inductor reaches a zero value, wherein the switching means and second detecting means cooperate to drive the third and fourth switching transistors to operate in the critical discontinuous mode (CDCM) and a triangular current of constant amplitude flows in the second inductor.

27. The electronic ballast as claimed in claim 26 wherein said second detecting means comprises a saturable transformer connected in series circuit with the second inductor.

28. The electronic ballast as claimed in claim 27 further comprising a filter capacitor coupled to the pair of output terminals.

29. The electronic ballast as claimed in claim 21 further comprising a filter capacitor coupled to the first and second input terminals whereby said sine wave envelope is substantially in phase with a sinusoidal input current received at the first and second input terminals.

30. The electronic ballast as claimed in claim 21 wherein the switching means switches the first and second switching transistors so that said circuit point is periodically connected to first and second terminals of the storage capacitor.

31. The electronic ballast as claimed in claim 21 further comprising third and fourth switching transistors serially connected in parallel with the storage capacitor, and
    further means for periodically switching the third and fourth switching transistors on and off in mutually exclusive time intervals and at the frequency of the AC supply voltage present at the first and second input terminals.

32. A ballast apparatus for driving a lamp comprising:
    two switching transistors that switch on and off out of phase with each other,
    an inductor supplied with current in response to said switching, wherein the inductor current is in the form of a series of substantially triangular waveforms of varying amplitudes,
    means for utilizing the inductor current to drive a discharge lamp,
    a filter connected so that said triangular waveforms are first filtered prior to being utilized to drive said discharge lamp, and
    means connecting the inductor to a saturable transformer.

* * * * *